March 24, 1970     H. R. BILLETER     3,502,374
BRAKE CYLINDER RELEASE VALVE
Original Filed Jan. 25, 1968     4 Sheets-Sheet 1
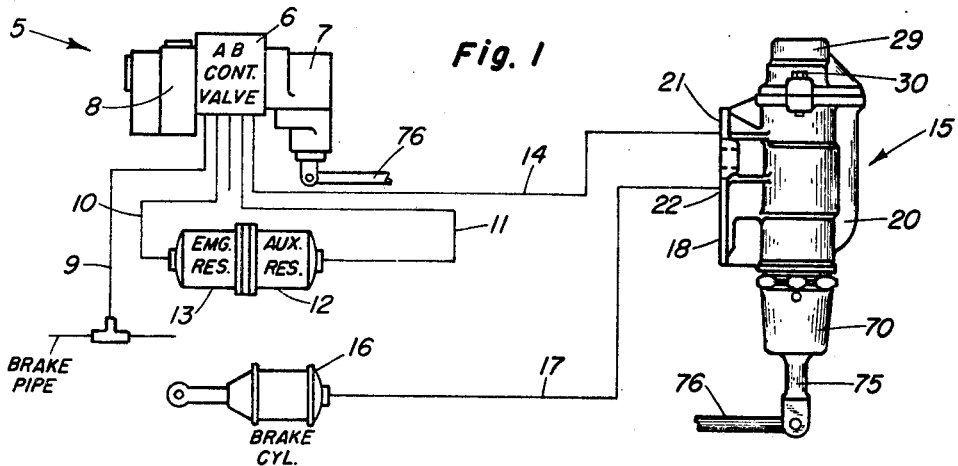
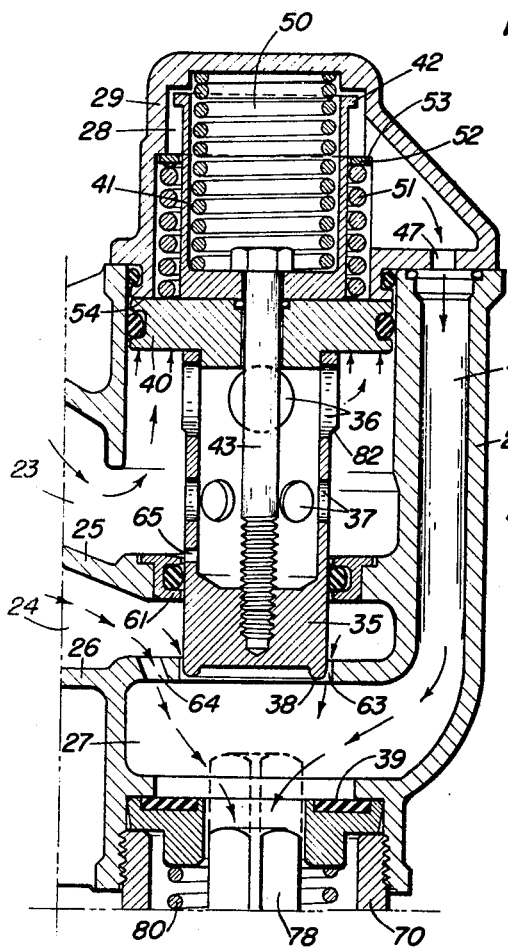
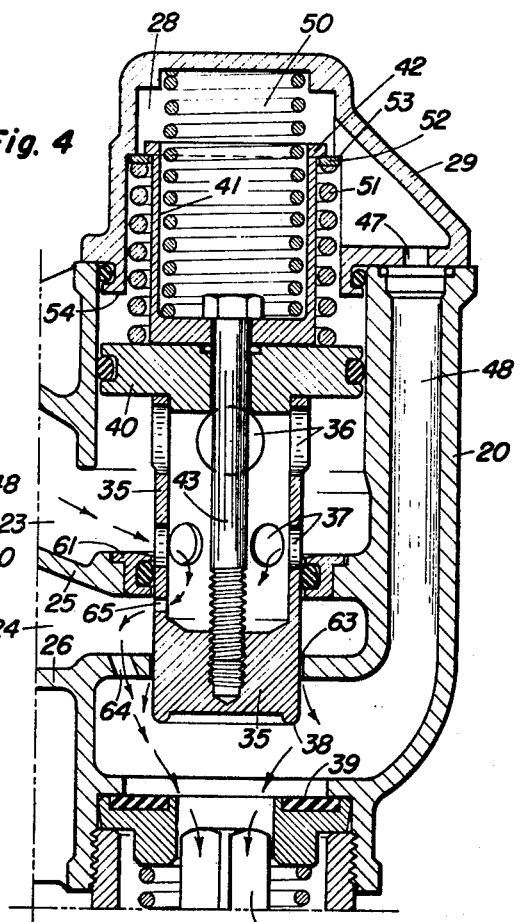
INVENTOR.
HENRY R. BILLETER
BY
PARKER & CARTER
ATTORNEYS

INVENTOR.
HENRY R. BILLETER
BY
PARKER & CARTER
ATTORNEYS

March 24, 1970     H. R. BILLETER     3,502,374
BRAKE CYLINDER RELEASE VALVE
Original Filed Jan. 25, 1968     4 Sheets-Sheet 3

INVENTOR.
HENRY R. BILLETER
BY
PARKER & CARTER
ATTORNEYS

March 24, 1970  H. R. BILLETER  3,502,374
BRAKE CYLINDER RELEASE VALVE
Original Filed Jan. 25, 1968  4 Sheets-Sheet 4

INVENTOR.
HENRY R. BILLETER
BY
PARKER & CARTER
ATTORNEYS

United States Patent Office 3,502,374
Patented Mar. 24, 1970

3,502,374
BRAKE CYLINDER RELEASE VALVE
Henry R. Billeter, Deerfield, Ill., assignor to Sloan Valve Company, Chicago, Ill., a corporation of Illinois
Continuation of application Ser. No. 700,633, Jan. 25, 1968. This application Sept. 23, 1968, Ser. No. 776,294
Int. Cl. B60t 15/32
U.S. Cl. 303—69          20 Claims

ABSTRACT OF THE DISCLOSURE

A brake cylinder release valve for railway cars which is manually tripped to vent the air pressure from the brake cylinder to release the brakes while conserving the air pressures in the reservoirs, and which is automatically reset when the car is again placed in service and brake pipe pressure is restored.

---

This application is a continuation of and discloses and claims only subject matter disclosed in my copending application Ser. No. 700,633, filed Jan. 25, 1968, which in turn was a continuation of and disclosed and claimed only subject matter disclosed in copending application Ser. No. 467,048, filed June 25, 1965, now abandoned, and Ser. No. 608,550, filed Jan. 11, 1967, now abandoned.

Background of the invention

The purpose of the brake cylinder release valve is to conserve the air pressure in the emergency and auxiliary reservoirs of a railway car while venting the brake cylinder to permit release of the car brakes whenever a car is cut out of a train. The release valve makes it possible for a car to be reassembled into a train so it is ready to operate without waiting for the build up of air pressure in all of the reservoirs of the cars in the train, thereby conserving air, eliminating recharging of the entire brake system, and saving time, as well as wear and tear on the equipment.

Description of the prior art

It has been the former practice to provide certain brake cylinder release valves with a small auxiliary reset valve, spring pressed to its seat and which controlled a restricted by-pass. This reset valve operated to close the by-pass when reservoir pressures in the control chamber are normal, but which opened the by-pass at certain predetermined lower pressures above retainer valve pressure to permit resetting the brake cylinder release valve after it has been manually tripped, thereby reducing reservoir pressures to a value that the resetting of the main valve does not result in a brake application. These former reset valves were unreliable in operation, were difficult to adjust for proper spring tension, the small piston employed often became stuck or the restricted by-pass became clogged. The addition of the auxiliary reset valve also increased the overall cost of the brake cylinder release valve.

Summary of the invention

The invention of the present application constitutes a substantial advance over and simplification of the prior art. Basically, it provides a single unitary valve structure which, under varying conditions, may be at three different positions, which may roughly be defined as a closed position, an open position, and an intermediate position, the purposes of the three-position arrangement being explained in detail below. Two major embodiments of the invention are illustrated, in one of which the brake cylinder release valve includes a cylindrical sleeve valve having two sets of air ports in its sides, together with a bottom end controlling an air vent seat and a piston supported on top of the valve member. This was the form originally described and claimed in application Ser. No. 608,550. In the earlier filed application, Ser. No. 467,048, a valve stem is employed, having a double-acting valve member on one end and a piston on the other, as will be described below in detail.

Considering first the form in which a cylindrical sleeve is used, with two sets of air ports in its sides it may be described as follows:

One set of air ports is located normally in the control chamber and the other in the brake cylinder chamber. When the valve is manually tripped to release the brakes the sleeve valve is shifted upwardly to block off the passage of air from the control chamber to the brake cylinder and to exhaust the brake cylinder through the vent valve. A reset spring is effective to restore the valve member when the car is again placed in a train. A second reset spring is effective when the control chamber pressure is reduced to a predetermined value so the valve member moves to an intermediate position where a restricted by-pass in the valve member bleeds the air slowly through the vent seat. The present invention eliminates the separate reset valve formerly required, is more reliable in operation, simpler in construction, provides long service life, and is relatively free from constant service and maintenance.

The valve remains in its actuated position in the event the reservoir pressures are more than a predetermined value when the valve is tripped to prevent reservoir air from flowing into the brake cylinder during regular service brake applications. The present arrangement also provides that the valve is reset automatically in case it is tripped at a time when the reservoir pressures are less than a predetermined minimum pressure as would be the case during an unintentional or partial service application of the brakes which could occur on a down-grade run of the train, for instance.

In many cases when a railway car is standing on a siding or repair track, the reservoir pressure would reduce to a value low enough to result in the brake cylinder release valve automatically resetting through leakage from the system, and when this occurred the remaining air would suddenly equalize with the brake cylinder pressure at a pressure high enough to cause a braking action, thereby creating a hazard to a workman working on the brakes of the car. It is accordingly an object to design the improved brake cylinder release valve so as to reduce the reservoir air pressure to a point which will avoid supplying the brake cylinder with air pressure sufficient to cause a brake application, and will cause resetting of the brake cylinder release valve only after such reduction in reservoir pressures.

The brake cylinder release valve is controlled and operated in three distinct and separate stages. First, under normal running conditions when it provides a clear passage between the AB control valve and the brake cylinder; second, when the valve is tripped and the brake cylinder is exhausted while the air is trapped in the reservoirs; and third, the intermediate position in which certain lower pressures present in the control chamber are caused to be slowly bled and vented to a valve where the valve is reset.

The form in which a double acting valve is employed will be described in detail below and need not be further discussed in the present summary.

Further objects of the invention are to provide a new and improved brake cylinder release valve having certain novel features of construction, operation and ease of assembly.

Brief description of the drawings

FIGURE 1 is a side view of one form of the improved brake cylinder release valve together with a diagrammatic illustration of certain parts of a train braking system associated therewith;

FIGURE 3 is a partial cross-section of the valve in its tripped or operated position;

FIGURE 4 shows the valve of the above figures in its partially operated position;

Description of preferred embodiment

Figure 2:
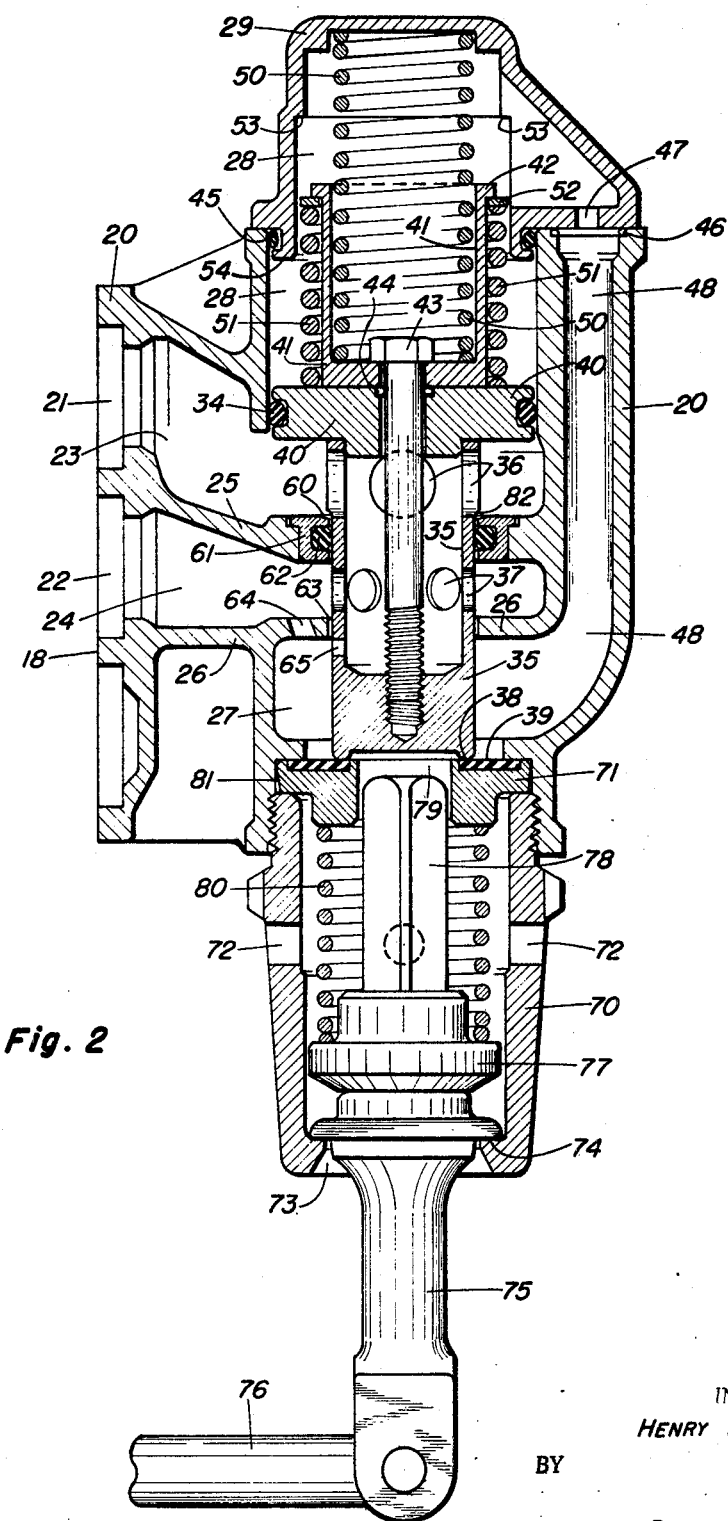
FIGURE 2 is a cross-sectional side view of the improved brake cylinder release valve of FIGURE 1 shown in its normal position.

As shown in FIGURE 1, the brake apparatus is arranged to be mounted on a railroad car and usually consists of a brake controlling mechanism indicated generally at 5, such as the well known "AB" brake control valve having the pipe bracket portion 6, a service portion 7, and an emergency portion 8. The "AB" control valve is supplied with air pressure through the train brake pipe 9. Leading from the pipe bracket 6 are pipe connections 10 and 11 extending to the auxiliary reservoir 12 and emergency reservoir 13, respectively. A pipe connection 14 extends from pipe bracket 6 to the brake cylinder release valve indicated generally at 15. The usual brake cylinder 16 is connected by pipe 17 to the release valve 15. The release valve 15 is preferably mounted directly upon the pipe bracket side 6 of the "AB" control valve 5, for example, against the flat side surface 18 by means of bolts not shown.

Referring to FIGURE 2, the brake cylinder release valve 15 comprises a casing or body 20 having a side opening 21 to which the "AB" valve connection 14 is suitably secured and a second side opening 22 to which the pipe 17 leading to the brake cylinder 16 is connected. The "AB" inlet opening 21 leads into the pressure chamber 23 while the brake cylinder outlet opening 22 extends from chamber 24. A partition 25 divides the two chambers. A second partition 26 divides the outlet chamber 24 from the exhaust chamber 27 at the bottom end of the casing 20. A piston chamber 28 is at the top end of the casing and is closed off by the cover 29 clamped in place by bolts 30 on top of the casing 20.

The operating piston and valve assembly consists of a cylindrical hollow sleeve type valve member 35 having a series of four air ports 36 spaced around the upper end thereof, and a second row of six smaller air ports 37 arranged below the air ports 36. The upper row of air ports 36 are normally positioned in the chamber 23 while the lower series air ports 37 are positioned in the chamber 24. The hollow valve member 35 is closed at the lower end and has a circular valve seating portion 38 externally formed thereon normally resting upon the exhaust or air vent valve seat 39 located in the exhaust chamber 27. A circular piston 40 serving as a movable abutment and reciprocal in chamber 28 with valve member 35 is mounted directly on top of the valve member 35 and has an O-ring seal 34 arranged around its periphery in slidable contact with the walls of chamber 28 thereby separating chambers 28 and 23 from each other. Mounted directly upon the top of the piston 40 is a cup-shaped spring retaining member 41, the top rim of which is outwardly flanged at 42. A long screw bolt 43 extends through the length of valve member 35, and into threaded engagement with the bottom of the valve 35, thereby securely clamping all of the aforesaid elements together as a solid unit and movable together when actuated. An O-ring seal 44 is placed around the bolt 43 in the piston 40 to seal the bolt hole through the piston. The joint between the cover 29 and top of casing 20 is sealed by an O-ring 45 and a smaller O-ring 46 provides a seal around air passages 47 and 48 at that location between the cover 29 and casing 20.

Within the piston chamber 28 there is a reset or restoring spring 50 extending between the bottom of cup member 41 and the cover 29. It may have an effective force of five pounds pressure to oppose the air pressure in chamber 23 and on the valve member 35 to hold it down and closed against exhaust seat 39. A second reset spring 51, which may have an effective force of 35 pounds, extends between the top of piston 40 and against a ring 52 pushing up against the underside of the flange 42 of the cup-shaped member 41. In certain positions of the piston 40 the springs 50 and 51 assist one another in the restoring action of the piston and valve member 35. The reset spring 51 does not become compressed in the upward movement of the piston 40 until the ring 52 engages a shoulder 53 formed on the inside of the cover 29. This position of the piston 40 represents only a partial opening movement of the valve member 35 while the full opening movement takes place when the top side of the piston 40 engages the bottom shoulder 54 formed on the cover 29, for the purposes hereinafter pointed out. Although we have indicated illustrative values for the springs 50 and 51, obviously the invention should not be limited to the specific values described.

The partition 25 has an opening 60 through which the sleeve valve member 35 is slidable. An insert 61 is tightly fitted into the opening 60 and supports an O-ring 62 to seal off the chambers 23 and 24 from each other in the position shown in FIGURE 2. The opening 63 in partition 26 loosely guides the valve member 35 therein and is not sealed between chambers 24 and 27 permitting air to pass around the valve member 35. An air passage 64 in partition 26 connects chambers 24 and 27 and a small air passage 65 extends from the interior of the valve member 35 through the bottom wall into the exhaust chamber 27, in the normal position of the valve shown in FIGURE 2.

At the bottom end of the brake cylinder release valve casing 20 there is a socket 70 screwed into the casing and clamping the collar 71 containing valve seat 39, directly to the bottom of the casing. Socket 70 has a series of exhaust openings 72 around its sides and a bottom opening 73 having a shoulder 74 therearound for supporting the release lever 75. The release lever 75 is connected to the usual manual operating rod 76 so that a pull on the rod 76 tilts the lever 75. Within the socket 70 there is a plug 77 abutting the top of lever 75 and having a square stem 78 extending upwardly to within a spaced distance 79 from the bottom of valve member 35 and in operational relationship therewith. A restoring spring 80 extends between the bottom of collar 71 and the plug 77 to hold the lever 75 normally tensioned in its vertical position as shown.

Operation of brake cylinder release valve form of FIGURES 1 to 4, inclusive

In the operation of the device, assume the brake equipment shown in FIGURE 1 to be fully charged with air under the required pressures of about 40 p.s.i., the "AB" control valve 5 to be in brake release position, and the brake cylinder release valve 15 to be in its normal or service position, as shown in FIGURE 2. Under these normal conditions and with the train under way, the brake cylinder 16 will be connected directly to the "AB" control valve by way of pipe 17, port 22 and chamber 24 of the brake cylinder release valve 15, through air ports 37 and 36 of the sleeve valve 35, chamber 23, port 21 and pipe 14 to the pipe bracket 6 of the "AB" control valve. The passage for air between the brake cylinder 16 and the "AB" control valve 5 is thereby complete so the engineer is able to control the train and apply the brakes in the usual manner, the same as if the brake cylinder release valve were not interposed. The brake cylinder release valve is held seated during the normal running of the train by virtue of the presence of air pressures in chambers 23 and 24, and the differential pressure downward on the bottom of the valve member 35. This force, together with the pressure on top of the piston 40 by way of passages 64, 48 and 47, assisted by the reset spring 50, are sufficient to hold the valve member 35 tightly upon its seat 39. The air passage 48 enables the pressures to equalize on both sides of the piston 40. Communication between the "AB" control valve and the brake cylinder release valve is thereby maintained and the brakes can be operated in the usual manner.

Under the above circumstances, changes in pressures of the air in the train pipe 9 brought about by the engineer so as to cause the "AB" control valve to control brake operation, do not in any manner upset the position of the brake cylinder release valve, to maintain a clear passage between the two control valves. When the air pressure is released entirely from the train brake pipe 9, as when a car is cut out of a train, the release valve remains in its set position, permitting continued brake holding application by the "AB" control valve from the air pressure in the reservoirs.

When it is desired to bleed off the air and release the brakes on a car which has been switched to a siding, the brakeman pulls the rod 76 to tilt the lever 75, thereby forcing the plug 77 upwardly against the tension of restoring spring 80 and the pressure in chamber 23. The upper end of square stem 78 contacts the lower end of the valve member 35, resulting in the forceful initial upward movement of the valve member 35 opening its valve seating portion 38 from the exhaust valve seat 39. This action begins to exhaust the air pressure from the brake cylinder 16 via pipe line 17, chamber 24, passage 64, open valve seat 39, and into the socket 70 and out through the ports 72. As the pressure in chamber 27 drops and relieves pressure from the top side of piston 40 and the air ports 37 become restricted due to passing through O-ring 62, the predominant reservoir pressure in chamber 23 becomes effective on the large bottom surface of piston 40 and quickly snaps the valve member 35 further upward and against the spring pressure 50. The upward movement of piston 40 and the valve member 35 is stopped when the top edge of piston 40 engages the shoulder 54 on the bottom edge of cover 29. FIGURE 3 shows the final position of the elements under the foregoing conditions.

The air pressure on top of the piston 40 in the top chamber 28 during the above action is exhausted through the restricted by-pass 47 and downward through passage 48 past the valve seat 39 and outward through the socket 70. The restricted passage 47 prevents the pressures from chamber 28 being exhausted too quickly so the upward movement of the valve assembly will not be too abrupt, but cushioned. Spring 51 is compressed when ring 52 engages shoulder 53 so that both springs 50 and 51 are now compressed and under tension. In the complete upward position of the valve and piston assembly the reservoir air pressure in chamber 23 is now trapped and prevented from being exhausted because the air ports 37 are now positioned in chamber 23 and the O-ring 62 seals off the partition 25. The bleed orifice 65 is also now positioned in chamber 23. The passage of air from the chamber 23 to the brake cylinder 16 is now completely blocked while the brake cylinder pressure is completely exhausted to atmosphere from chamber 24, exhaust passage 64 and downward through the open valve seat 39. A portion of the air also passes around and below the valve seating portion 38 and opening 63 since there is a relatively loose sliding engagement between these elements for the escape of air as shown in FIGURE 3.

It will be seen from the foregoing action that tripping the brake release valve results in the brakes being released on the car and the air in the reservoirs being retained while the car is not connected in the train so that it can be moved. However, when the car is again assembled in the train, it is ready to operate and move without waiting for the build-up of air pressures in the reservoirs.

One purpose of the restricted passage 47 is to insure that during the time that a brake application is being made by the "AB" control valve, and the air pressures are fluctuating within chambers 23 and 24 of the brake release valve, the valve and piston assembly will not be disturbed from its seated position on seat 39. The restricted passage 47 prevents to rapid escape of air pressure from chamber 28 above the piston 40 during these conditions.

Under certain operating conditions of the train a partial reduction in air pressures in chamber 23 may occur during operation of the car. Such instance could be when a partial or light brake application is made on the train going down a grade and when the operating lever 75 is unintentionally or accidentally tripped. Leakage could also occur in the air delivery pipe or in the "AB" control valve should it move into its release position. Under any of the foregoing assumed conditions, upon the reduction of air pressure in chamber 23 to about 35 p.s.i. from the normal 40 p.s.i., the piston 40 is forced downward partially in chamber 28 by the heavy reset spring 51 from shoulder 54, and stops when the ring 52 leaves shoulder 53 and spring 51 is fully expanded. The pressure from chamber 24 through passages 64, 48 and 47 and into the chamber 28 on top of the piston, assists in this resetting action. This intermediate position of the piston and valve assembly is illustrated in FIGURE 4. As a result of the above action, the valve ports 37 remain positioned in chamber 23 so the low pressure therein can bleed down through the restricted bleed opening 65 which is now positioned immediately below the O-ring seal 62. This reduced pressure is now slowly bled into the brake cylinder chamber 24 and then through orifice 64 and also valve opening 63 and outward through the open valve seat 39 to atmosphere.

Eventually the pressure in chamber 23 is reduced to a point where either the "AB" valve goes into release or the light spring 50 exerts its effective force of about 5 p.s.i. downward upon piston 40 and valve member 35, thereby closing the exhaust seat 39, and resetting the release valve so that communication is again established between the control chamber 23 and the brake cylinder chamber 24 by way of the ports 36 and 37. Further escape of air pressure from the reservoirs and brake cylinder is thereby prevented. It will be noted that under any of the foregoing abnormal operating conditions the release valve is automatically reset to quickly enable the valve to be restored to its normal operating position. The above-described operation comes about when there is a reduction in air pressure within the chamber 23 from normal 40 p.s.i. to about 35 p.s.i. Substantially the same operation comes about when the valve is oeprated with the pressure in chamber 23 at about 35 p.s.i. Although in this latter condition, the piston 40 will only travel upward to the position of FIGURE 1. It will not move to the position of FIGURE 3 inasmuch as there is not sufficient pressure in chamber 23 to compress spring 51.

Returning now to the condition in which the car, having been spotted on a siding, is again coupled up in a train for movement, the train pipe pressures are then restored, and the "AB" control valve assumes its release position. This action reduces or exhausts the pressure in chamber 23, which had in the meantime been holding the piston 40 in its upward position, closing communication between chambers 23 and 24 and exhausting the air from the brake cylinder. Reset springs 50 and 51 are now effective to exert their restoring force downward upon the piston and valve assembly, thereby again establishing communication between chambers 23 and 24 through ports 36 and 37 and closing valve seat 39 from further escape of air pressure. The "AB" control valve will again be in position to control brake applications to the brake cylinder in the normal operation of the train.

From the foregoing it is seen that the brake cylinder release valve constructed according to the present invention, as embodied in the forms of FIGURES 1 to 4, inclusive, presents a number of desirable advantages. The time necessary to bleed and then recharge the brake system of a train is greatly reduced. The valve, when tripped automatically, exhausts the air from the brake cylinder to atmosphere to release the brakes and, at the same time, conserves the air in the reservoirs. Also, the valve will automatically reset when inadvertently tripped during operation of the car in a train, or if there is leakage in the system. The novel valve does not employ an auxiliary reset valve in addition to the main valve; but, instead, employs simple mechanical and spring control means to accomplish the desired purpose.

An important advantage derived from the present invention resides in the use of the sleeve valve member 35 which is slidable through the O-ring 62, providing an airtight seal that is effective regardless of the pressures holding the piston in position, thereby insuring positive operation of the valve member, particularly so when the piston is balanced by the air pressure in chamber 23 on one side and springs 50–51 on the other, at the critical values between 30 p.s.i. and 40 p.s.i. This position is shown in FIGURE 4 wherein the bleed opening 65 slowly vents the pressure until the valve resets. In former types of brake cylinder release valves of the poppet type, the seating of the valve member was difficult to control with any degree of exactness and the seal was not always positive due to dirt, etc., present on the valve seat.

The valve is operated in three separate and distinct stages, depending upon conditions encountered. First, during normal operating conditions on a train run, when the ports 36 and 37 provide a clear passage between the "AB" control valve and the brake cylinder; second, when the valve is manually tripped to release the car brakes and the air pressure is trapped in chamber 23 so the air in the reservoirs is conserved while the brake cylinder pressure is exhausted; and, third, the intermediate position of the valve in which reduced pressure in chamber 23 results in the spring 51 partially restoring the valve member so that the bleed opening 65 only is effective to slowly bleed off the air from chamber 23 until the pressure is low enough for spring 50 to effect the complete resetting of the valve.

A further advantage of the present valve assembly is that, by removing the cover 29, the entire valve assembly, including the sleeve valve member 35, piston 40, cup member 41 and the springs 50 and 51, can be withdrawn from the casing as a unit, for easy repair or inspection. Similarly, the socket 70 can be unscrewed from the casing 20 and the parts within the socket removed or inspected. The collar 71 supporting the valve seat 39 will drop out readily due to its tapered sides 81 which also help maintain the valve seat level. A shoulder 82 around the sleeve valve member 35 below the ports 36 prevents the sleeve member 35 from dropping down when the socket 70 is removed.

Figure 5:
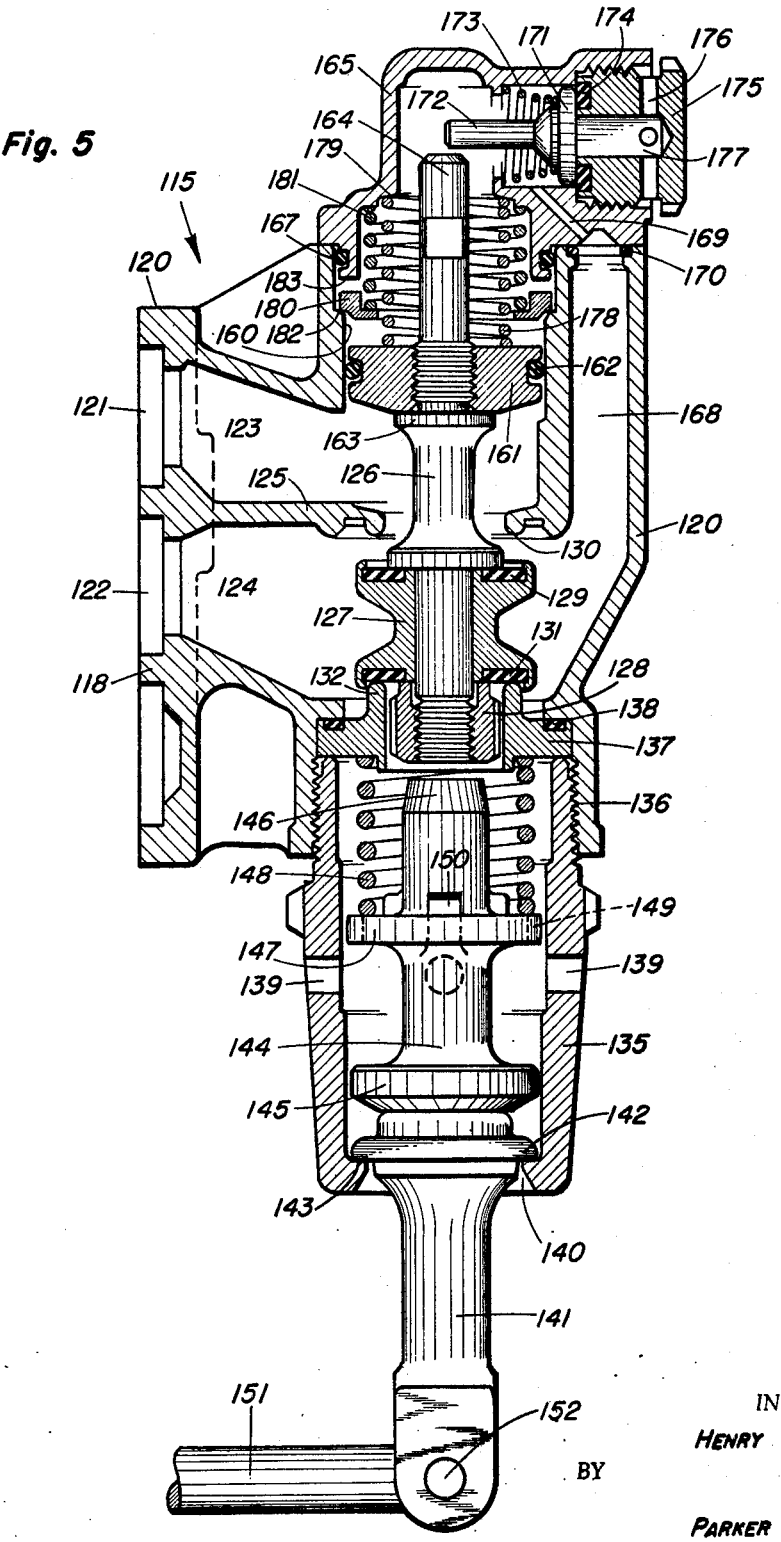
FIGURE 5 is a cross-sectional side view of another form of brake cylinder release valve adapted for the three-position operation above discussed.
Figure 6:
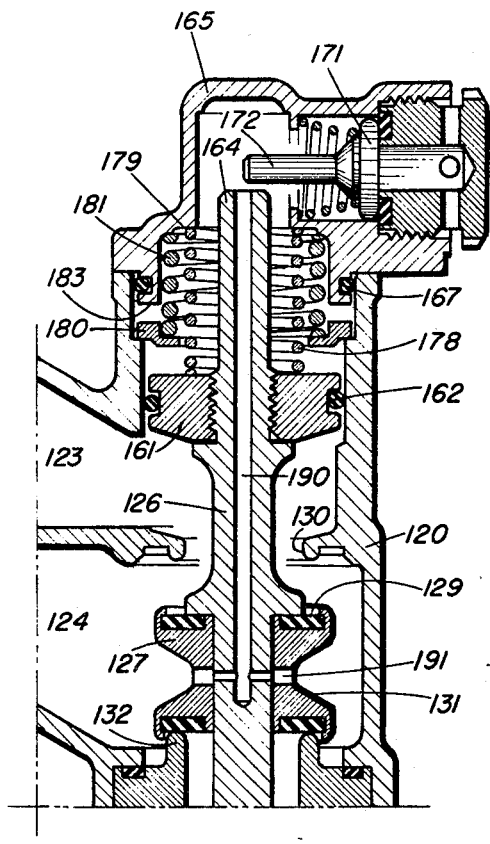
FIGURE 6 is a partial cross-section of a modification of the structure of FIGURE 5.
Figure 7:
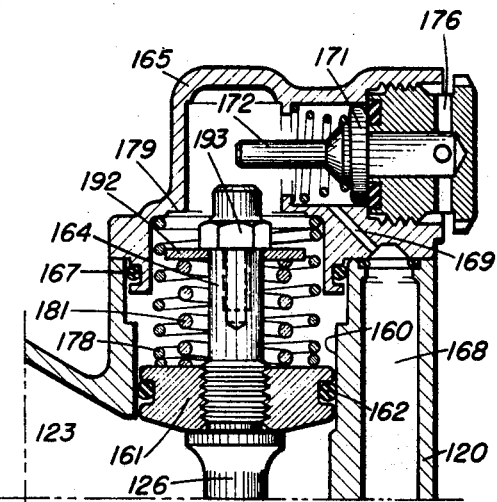
FIGURE 7 illustrates a further modification.

Description of the embodiment of FIGURES 5, 6 and 7

Referring to FIGURE 5, the brake cylinder release valve 115 comprises a central casing or body portion 120 having a side opening 121 to which the "AB" valve connection may be suitably secured and a second opening 122 to which the pipe leading to the brake cylinder 16 of FIGURE 1 may be connected. The inlet opening 121 leads into the pressure chamber 123 while the outlet opening 122 leads into the outlet chamber 124. A partition 125 divides the two chambers. The casing 120 is centrally bored to provide for the piston and valve assembly, including supporting stem 126 having the double acting valve member 127 clamped on the lower end of the stem by a nut 128. Valve member 127 is provided with a valve seating washer 129 arranged for seating engagement with upper valve seat 130 in partition 125, and a lower valve seating washer 131 normally in engagement with the lower valve seat 132. The valve seats 130 and 132 are arranged in axial alignment with the double acting valve member 127 between them. At the bottom end of casing 120 there is positioned a socket member 135 which is threaded at its upper end at 136 to the casing 120. A collar 137 carrying valve seat 132 is clamped by socket 135 against the bottom of the casing 120 and a leakproof sealing washer 138 is arranged on top of collar 137, as shown.

The socket 135 has a series of openings 139 in its sides and an axial opening 140 at its bottom through which a manual operable release lever or rod 141 projects. A collar 142 resting on shoulder 143 retains the lever 141 in depending position from the bottom of the release valve. Release lever 141 is connected to the usual manual operating rod 151 at its lower end 152, so as to enable a pull on the rod 151 to tilt the lever 141 when the rod is pulled. Within the socket 135 there is arranged a cylindrical plug 144 with the lower end 145 abutting the end of lever 141 and the upper end 146 being spaced slightly from the bottom end of the stem 126. A collar 147 on plug 144 serves as a support for one end of restoring spring 148, the upper end of which engages the collar 137. Spring 148 normally urges the plug 144 downward in socket 135 and also maintains the lever 141 tensioned in its vertical position as shown. The collar 147 is provided with a series of air passages 149, together with reinforcing ribs 150 between the passages.

The brake cylinder release valve 115 is arranged at its top end with a cylinder 160 in which the piston 161 serving as a movable abutment is adapted to travel. O-ring packing 162 seals the piston 161 in the cylinder and the piston itself is screwed tight onto a shoulder 163 on the stem 126. Stem 126 has its upper end 164 projecting for a distance beyond the piston 161. The top of casing 120 is provided with a hollow cover 165 secured thereto as by bolts 166 and sealed by O-ring 167 in the cylinder 160. An air passage 168 formed in body 120 extends upwardly from chamber 124 onto the cover 165 and is connected to a restricted passage 169 leading into the interior of hollow cover 165. The cover 165 is sealed to the end of passage 168 by an O-ring 170.

The hollow cover 165 supports a relief valve member 171 having a stem 172 extending laterally into close proximity of the upper end of stem 164 whereby stem 172 is adapted to be tilted whenever stem end 164 is projected in an upward direction. Spring 173 around stem 172 and under valve member 171 serves to restore the relief valve and stem to normal position after each operation. The valve seat for the relief valve 171 is indicated at 174 and is supported in a plug 175 threaded longitudinally into the cover 165. Perpendicular passages 176 and horizontal passage 177 lead to atmosphere from the closed side of the relief valve 171. For the purpose of restoring the brake cylinder release valve stem assembly a light spring 178 is arranged in cylinder 160 between the top of piston 161 and a shoulder 179 formed in cover 165.

Arranged in spaced relationship above the piston 161 is a collar 180 slidable in cylinder 160 and spring pressed by heavy spring 181 against shoulder 182 formed in the cylinder. The other end of spring 181 bears against the shoulder 179 in the top of the cover 165. The upward movement of collar 180 when engaged by the piston 161 is sufficient to allow the main valve member 129 to close upon valve seat 130. The arrangement is such that upward movement of the piston 161 will first compress spring 178 and upon engaging collar 180 spring 181 will also be compressed. The light spring 178 may have an effective force of about 5 pounds while the heavier spring 181 may have about a 30 pound force when compressed.

Operation of brake cylinder release valve form of FIGURES 5, 6 and 7

In the operation of the device, assume the brake equipment shown in FIGURE 1 to be fully charged with air under pressure, the AB control valve 5 to be in brake release position, and the brake cylinder release valve 115 to be in its normal or service position, as shown in FIGURE 5. Under these conditions and with the train under way, the brake cylinder 16 will be connected directly to the AB control valve by way of pipe 17, port 122 and chamber 124, of the brake cylinder release valve 115, through valve seat 130, chamber 123, port 121 and pipe 14 to the pipe bracket 6 of the AB control valve. The passage for air between the brake cylinder 16 and the AB valve 5 is thereby complete so the engineer is able to control the train and apply the brakes in the usual manner, the same as if the brake cylinder release valve were not interposed. The brake cylinder release valve is held seated in the normal running position by virtue of the presence of air pressure in chambers 123 and 124, the differential pressure downward on top of the valve member 127 and atmosphere on the bottom, together with the downward tension exerted by restoring spring 178. These forces are sufficient to hold the valve member 127 closed down tight on its lower seat 132 under the foregoing conditions. The air passage 168 equalizes the air pressure on both sides of piston 161. Communication between the AB control valve and the brake cylinder is thereby maintained and the brakes can be operated in the normal manner.

Under the above circumstances, changes in pressure of the air in the train pipe brought about by the engineer so as to cause the AB control valve to control brake operation, do not in any way upset the position of the release valve. The release valve maintains a clear passage for air between the AB control valve and the brake cylinder. When the air pressure is released entirely from the train brake pipe 9, as when a car is cut out of a train, the release valve remains in its set position, permitting continued brake holding application by the AB control valve of the air under pressure in the reservoirs.

When it is desired to bleed off the air and release the brakes on the switched car, the brakeman manually actuates lever 151 to tilt the handle 141 in any chosen direction to force the plug 144 upward against the tension of restoring spring 148 and the AB pressure in chamber 123. The end 146 of plug 144 contacts the lower end of stem 126, resulting in the forceful upward movement of the stem 126 and the opening of the air release seat 132 and closing of holding seat 130 by valve member 127. This action exhausts the air pressure immediately from the brake cylinder 16, via chamber 124, release seat 132, downward through the openings 149 in plug disc 147 and to atmosphere through the openings 139 in socket 135. The brakes are thereby released in the usual manner.

As a further result of the closing of valve seat 130 by valve member 127, the passage 124 to the brake cylinder 16 from the AB valve is completely closed and escape of air pressure through seat 130 from the emergency and auxiliary reservoirs 12 and 13 is thereby prevented. There is therefore no possibility of air being lost from the reservoirs while the car is not connected up with the train, and, when the car is again assembled in a train, it is ready to operate without waiting for build up of air pressure in the reservoirs.

One purpose of the restricted passage 169 is to insure that during the time that a brake application is being made by the AB valve, and the air pressures are fluctuating within the chambers 123 and 124 of the brake release valve, the valve member 127 would not be disturbed or "jiggled" on its seat 132. The restricted passage 169 prevents too rapid escape of air pressure from above the piston 161 during these conditions and the valve remains seated and stable in its closed position.

Again as a further result of the upward movement of valve stem 126 and a short time after the valve seat 132 is opened, the upper end 164 of the stem 126 contacts the relief valve stem 172 and tilts it upward. The tilting of relief valve 171 off its seat 174 permits a complete and rapid exhaustion of the air pressure from above the piston 161, through relief valve seat 174 and passages 176 and 177 to the atmosphere. When this occurs, the pressure on top of piston 161 being completely released, the valve member 127 is quickly and smoothly closed upon its upper seat 130 and remains in this set position as long as the car is disconnected from the train. The valve member 127 and stem 126 remain held in the foregoing upward position even after the handle 141 is released and restored by springs 148, because the AB pressure now present in chamber 123 on the underside of piston 161 is present over a greater pressure area than that on top of the valve member 129 within the area of its closed seat 130. Thus the pressure from the AB valve holds the release valve in the upper or brake cylinder release and reservoir closing position against the tension of springs 178 and 181. With the brakes released, the car can then be moved but no further air is lost through the AB valve and further manipulation of the handle 141 can have no effect on the brake release valve. The reservoirs 12 and 13 retain their pressures while the brake cylinder 16 is completely exhausted so the brakes are in relased position.

With the closure of valve 129 upon seat 130, the AB valve air pressure, which under normal running conditions is about 40 pounds or more, is trapped in chamber 123 to prevent loss from the reservoirs. The underside of piston 161 is also subjected to this pressure and as it was moved upward it first compressed light spring 178 and then contacted and lifted collar 180 upward to compress heavy spring 181. When collar 180 is stopped short of the shoulder 183 and after only a short movement, the valve 129 will have been firmly seated on valve seat 130. The air pressure on the lower side of piston 161 holds the brake release valve in its upward position closing valve seat 130. The valve member 127 and stem 126 remain held in the foregoing upward position as has been pointed out after the handle 141 is released.

In the event the air pressure in chamber 123 is reduced to 30 pounds or less while the car is in motion and the handle 141 is tripped, the brake release valve will automatically reset itself when the handle is released to maintain the open passage between the chamber 123 and brake cylinder chamber 124. Such partial reduction in air pressure in chamber 123 could occur under conditions of partial or light brake application as may occur when a train is going down a grade and the handle 141 were unintentionally or accidentally tripped, or leakage existed in the air delivery pipe, or when the AB control valve goes into release position.

Under any of the aforesaid conditions of reduced pressures, and should the valve be tripped and then the handle 141 released, the piston 161 is partly forced downward by the collar 180 under control of heavy spring 181 until the collar is stopped on the shoulder 182, thereby halting the downward piston movement after a short distance of travel. This action causes the valve member 127 to open its upper valve 129 from valve seat 130 a relatively small amount, and likewise the valve 131 to remain open from its valve seat 132. This permits leakage to occur downward through the open valve seat 131 and exhaust openings 139 to atmosphere, relieving the pressure from the top of the piston 161 via restriction 69 and air passage 168. The relatively low pressure in chamber 123 is now further reduced by leakage downward through the partially open seats 130 and 132. Eventually the pressures are reduced to a point where light reset spring 178 exerts its effective force downward upon the piston and stem 126, thereby fully opening valve member 129 from seat 130 and tightly closing valve member 131 upon its seat 132 resetting the valve. Further escape of air pressure from the reservoir pressures in chamber 123 and the brake cylinder chamber 124 is thereby prevented. It is to be noted that during the foregoing action when the piston 161 is stopped in the intermediate position by collar 180, the upper stem end 164 is in contact with the relief valve stem 172 so that the relief valve 171 is opened at this time.

When a car is replaced in a train and pipe pressures are restored the AB control valve assumes its release position. This reduces the reservoir pressure in chamber 123, thereby permitting the restoring springs 168 and 181 to exert their stored energy against the top of piston 161, restoring the stem 126 and valve member 127 downward to normal position. As a result, the valve seat 132 is now closed while valve seat 130 is open, permitting a clear passage between the chambers 123 and 124, so that the AB control valve again has control of air pressures to the brake cylinder 16 for brake application. The brake release valve is now held in the above position by spring 178, and any further action by the AB valve in its operation will have no effect upon the position of the brake release valve.

Referring now to the modification shown in FIGURE 6, the general arrangement is similar to the brake cylinder release valve depicted in FIGURE 5, except that the air pressure from the top side of the piston 161 is relieved through an axial bore 190 in the stem 126 which extends downward to side bores 191 in the valve member 127 leading into chamber 124. The action is the same as the air passage 168 in FIGURE 5, the air pressure exhausting downward instead through passages 190 and 191 and then outward through the open exhaust valve seat 132 along with the air from the brake cylinder chamber 124, when the handle 141 is tripped. The valve will automatically reset itself if the pressures in the control chamber 123 drops to below 30 pounds and the valve member 129 is opened only partially from its seat 130 by the collar 180 and its spring 181.

In the modification shown in FIGURE 7, the general structure is also similar to that shown in FIGURE 5, except that the position of the reset springs 178 and 181 are reversed, with the relatively heavy spring 181 arranged inside the light reset spring 178. The collar 192 is placed on top of spring 181 instead of the bottom as in collar 180 of FIGURE 5. It is urged upwardly by spring 181 against the nut 193 threaded on the end 164 of stem 126. Upon upward movement of the stem 126 along with piston 161, spring 178 and then spring 181 are compressed, the latter when collar 192 engages shoulder 179. Responsive to a pressure drop to 30 pounds the collar 192 leaves the shoulder 179 so the piston moves downwardly only as far as spring 181 expands. As a result the valve 129 is opened only partially from its seat 130, and as the pressure is further reduced because of the leakage through valve seat 130 and 132, the spring 179 will cause the full downward movement of the piston 161 and reset the valve as has been pointed out.

It is to be seen that with brake cylinder release valves constructed according to the present disclosure, a number of desirable advantages are secured. The time necessary to bleed and then to recharge the brake system of a train is greatly reduced. The valve when actuated automatically exhausts only the brake cylinder pressure to the atmosphere, and at the same time conserves the air in the reservoirs. Both the time loss in manually bleeding and then recharging each individual car is eliminated while the air usually lost in manual bleeding is conserved.

From the foregoing it will be apparent that, according to the present invention, it is not necessary to employ an auxiliary reset valve in addition to the main valve; but, instead, simple mechanical means accomplish the same purpose. The valves of the present disclosure are operated in three separate and distinct stages. First, the normal conditions during which the railway car is in operation, when there is a clear passage between the AB control valve and the brake cylinder; second, when the valve is manually tripped to release the car brakes, and is closed to conserve the air in the reservoirs, while provision is made to exhaust the pressure from the brake cylinder; third, the intermediate position of the valve in which it is only partially opened when lower pressures are present in the control chamber, so that air pressures leak outward until the pressures are dropped to a point where the reset spring is effective to reset the valve back to normal.

Although both forms of the invention as disclosed in the specification and drawings incorporate a piston type of valve operating in a cylinder, the invention is equally applicable for use in a valve employing a diaphragm for the operating member, and this without changes in the structure and without detracting from the principle of the invention.

I claim:

1. In a brake cylinder release valve of the character described, a casing having a cylinder with a valve stem extending therein, a piston on said valve stem slidable in said cylinder, a main restoring spring in said cylinder extending between the top of said piston and said casing for urging said piston downward, a collar slidably retained in said cylinder above said piston and in spaced relationship therewith, a secondary restoring spring in said casing arranged in concentric relationship to said main spring and bearing against said collar, said springs being of different values, a shoulder in said casing arranged to stop the sliding movement of said collar and compress said secondary spring whenever said piston is moved upward, a valve member on said valve stem arranged below said piston for controlling an upper and a lower air passage in said casing, manual means for actuating said valve stem to cause said valve member to close said upper air passage and open said lower air passage, said piston operative thereby to first compress said main spring and then said secondary spring and to cause said collar to move upward against said casing shoulder, air pressure means acting upon said piston for holding said piston in its actuated position to maintain said upper air passage closed independent of said manual means and against the restoring action of both said springs, said valve member completely opening its upper air passage and closing its lower air passage in response to the air pressure acting upon said piston being reduced to a certain value, said valve member moving to an intermediate position in which the lower air passage is open and the upper air passage is partially open when the air pressure on said piston is less than that required to hold the valve member in its fully actuated position but greater than said certain value.

2. The brake cylinder release valve as claimed in claim 1, in which the main spring is effective in urging said piston and valve member downward and said secondary spring is effective to assist said main spring only during the time said collar is in engagement with the casing shoulder.

3. The brake cylinder release valve as claimed in claim 1, in which the main spring is effective to normally urge said piston and valve member downward at all times while said secondary spring is effective to assist said main spring until said collar moves away from said casing shoulder.

4. In a brake cylinder release valve for connection with a brake control valve and a brake cylinder, for railroad use, a casing having a first chamber adapted to be connected to said brake control valve, a second chamber adapted to be connected to said brake cylinder and an outlet from the second chamber to the atmosphere, a first valve seat adapted to control said outlet and a second valve seat between the first and second chambers, a valve assembly including a valve stem extending through both said chambers and having valve portions effectively opposable to both said valve seats, said valve stem having a piston at the end remote from said outlet, said casing including a cylinder in which said piston is positioned to move, a first restoring spring for said piston and a second restoring spring for said piston, said springs being arranged one within the other, a slidable collar in said cylinder associated with one of said springs, and means for limiting the movement of said collar within said cylinder, one of said restoring springs being normally effective to hold the opposed valve portion of the stem against the first valve seat, with the outlet to the atmosphere closed and with the first and second chambers in communication, whereby to maintain open, through the first and second chambers, a connection between the control valve with the brake cylinder, means for actuating said valve stem to open the outlet to the atmosphere and at the same time to close the connection between the first and second chambers, whereby the brake cylinder may exhaust through the release valve to the atmosphere, said piston being operative to compress said restoring springs, air pressure means of one value acting upon said piston for holding said valve assembly against the restoring action of the springs, and air pressure means of a different value for holding said valve assembly only partially closed against the restoring action of said springs, said piston being fully restored by said first spring, and said valve assembly being completely opened when said pressure means is reduced to a still further value.

5. In a brake cylinder release valve, a casing having a bore therein, an exhaust valve seat around the lower end of said bore, a valve stem reciprocal in said bore having a valve seating member on one end adapted to close said exhaust valve seat, a movable abutment on the upper end of said valve stem, a main restoring spring extending between the top of said movable abutment and said casing for urging said abutment and valve stem downward to close said exhaust valve seat, a cup-shaped collar in said casing resting against a shoulder in said casing and arranged above it and in spaced relationship to said movable abutment, a secondary restoring spring extending between the top of said cup-shaped collar and said casing and arranged in concentric relationship to said main spring, said secondary restoring spring urging said cup-shaped collar downward and against said casing shoulder, valve means on said valve stem for controlling an upper and lower air passage extending from said casing, manual means for causing said valve stem to move upwardly to close said upper air passage and to open said lower air passage, said movable abutment being thereby operative to initially compress said main spring and secondly to cause said cup-shaped collar to compress said secondary spring, air pressure means from said upper air passage being effective to hold said movable abutment in its upward position to maintain said upper air passage closed independent of said manual means and against the restoring action of both of said springs, said valve stem effective to open said upper air passage and to close said lower air passage in response to air pressure below said movable abutment being reduced to a low value to permit communication between said air passages, and only to partially open said air passage responsive to air pressure being reduced to an intermediate value, said valve stem effective in its upward movement to establish communication between said lower air passage and said exhaust valve seat.

6. The brake cylinder release valve as claimed in claim 5, in which the upper air passage is connected with a brake control valve, the lower air passage to a brake cylinder, and the exhaust valve seat to atmosphere.

7. The brake cylinder release valve as claimed in claim 5, in which the upper air passage when normally in communication with the lower air passage permits air brake pressure to pass into the brake cylinder, and upon said upper passage being closed blocks the air in said upper air passage while at the same time said lower air passage is opened to permit the air pressure in the brake cylinder to exhaust through said exhaust valve seat.

8. In a brake cylinder release valve, a casing having a bore therein, an exhaust valve seat around the lower end of said bore, a valve stem reciprocal in said bore having a valve seating member on its lower end adapted to close upon said exhaust valve seat, a movable abutment on the upper end of said valve stem, a main restoring spring in said casing for urging said abutment and valve seat, a slidable collar in said casing arranged above valve seat, a slidable collar in said casing rrnged above and in spaced relationship to said movable abutment, a secondary restoring spring for said collar arranged in concentric relationship to said main spring, valve means on said valve stem for controlling the opening and closing of an upper and lower air passage extending from said casing, manual operative means for causing said valve stem to move upwardly to close said upper air passage from said lower air passage, said movable abutment being thereby operative to first compress said main spring and then to cause said collar to compress said secondary spring, air pressure means of high value from said upper air passage being effective to hold said movable abutment in its upward position to maintain said upper air passage closed from said lower passage independent of said manual means and against the restoring action of both of said springs, said valve stem being effective under control of both of said springs to open said upper air passage to said lower air passage in response to air pressure below said movable abutment being reduced to a low value and thereby establish communication between said air passages, and said valve stem being effective to only partially open said air passages in response to air pressure of an intermediate value, said valve stem also being effective in its upward movement to establish communication between said lower air passage and said exhaust valve seat.

9. In a brake cylinder release valve for connection between a brake control valve and the brake cylinder of a railway car, a casing having a hollow movable valve member therein with a piston supported on the upper end of said valve member and an air vent seating portion on the lower end, a control valve chamber and a brake cylinder chamber in said casing, a flow passage connecting said control valve and said brake cylinder chambers, an air vent chamber below said brake cylinder chamber a flow passage connecting said brake cylinder chamber and said air vent chamber, an air vent seat in said air vent chamber normally closed by said valve member extending axially through all of said chambers and in sliding engagement with both of said flow passages, said hollow valve member having upper and lower ports in the sides thereof with one set of ports normally located in said control valve chamber and the other set in said brake cylinder chamber, whereby in the normal position of said valve member a flow path is etsablished extending from said control valve chamber through said upper set of ports and said flow passage and outward through said lower ports into said brake cylinder chamber, manual means for actuating said valve member to cause it to open said air vent seat and establish an exhaust path to atmosphere from said brake cylinder chamber while blocking air flow through said flow passage between said control valve chamber and said brake cylinder chamber, the air pressure in said control valve chamber holding said piston and said valve member in actuated position after release of said manual actuating means, and restoring means on top of said piston in said casing for returning said valve member to normal position.

10. In a brake cylinder release valve for connection between a brake control valve and a brake cylinder of a railway car, a casing having a control valve chamber, a brake cylinder chamber, and an air vent chamber therein, a hollow valve member in said casing having an air vent valve seating portion at one end and a piston supported on the other end, said casing having a flow passage therein arranged between said brake control chamber and said brake cylinder chamber, said hollow valve member slidably extending through said flow passage and having two sets of ports therein, with one set of ports normally positioned in said brake control chamber on one side of said flow passage and the other set of ports in said brake cylinder chamber on the other side of said flow passage to provide free flow of air between said chambers, manual means for actuating said valve member to shift the one set of ports from the brake cylinder chamber into said brake control chamber through said flow passage and to thereby block the air flow into said brake cylinder chamber, said valve member at the same time opening said air vent seat to exhaust said brake cylinder chamber to atmosphere, said piston subjected to air pressure of a predetermined value from said control valve chamber to maintain said hollow valve member in its actuated position, spring means in said casing on top of said piston for restoring said hollow valve member to normal position when the air pressure on said piston from said control valve chamber is reduced to its lowest value, said casing having a second flow passage arranged between said brake cylinder chamber and said air vent chamber through which said hollow valve member slidably extends, said hollow valve member having a restricted port therein normally positioned in said air vent chamber and below said second flow passage and blocked by said first flow passage when said hollow valve member is actuated, and a second spring means in said casing on top of said piston for restoring said hollow valve member to an intermediate position when the air pressure in said control valve chamber is reduced to a lower predetermined value, said restricted port being thereby shifted to a position in said brake cylinder chamber whereby the air pressure in said brake control chamber is exhausted through said restricted port into said air vent chamber and said hollow valve member is restored to normal by said spring means thereby resetting the valve member.

11. A brake cylinder release valve for arrangement between the brake control valve and brake cylinder of a railway car, a casing having a main valve member therein comprising a body including a piston on top and a vent valve seating member on the bottom, said valve member having means for controlling air flow from said control valve to said brake cylinder valve, said vent valve seating member controlling air flow from said brake cylinder valve to atmosphere, means for operating said valve member to its full operated position and to maintain it in said position, spring means of one value for restoring said valve member to its normal position, a second spring means of another value effective to partially restore said valve member, said valve member having a restricted port therein effective in the partially restored position of said valve member to cause said valve member to be fully restored.

12. In a brake cylinder release valve for connection between the brake control valve and the brake cylinder of a railway car, said valve having a movable valve member therein for controlling the passage of air between the brake control valve to said brake cylinder and from said brake cylinder to atmosphere, said valve member comprising a member having an air vent seating member on one end and a piston on the other end, said valve member having means for controlling air flow from said control valve to said brake cylinder valve, a restricted air passage in said valve member, reset spring means on top of said piston for controlling the movement of said valve member in accordance with variable air pressures from said brake control valve, said restricted air passage venting pressures of a predetermined value from said brake control valve to cause resetting of said valve member, and manual means for shifting said valve member to vent air pressure through said air vent seat from said brake cylinder.

13. The brake cylinder release valve as claimed in claim 12 in which a cup-shaped member supported on top of the piston has a reset spring carried on the inside thereof extending between the cup-shaped member and the valve casing, and a second reset spring around the outside of the cup-shaped member extending between the piston and a loose ring around the upper edge of said cup-shaped member.

14. In a brake release valve for interconnection between the brake control valve and the brake cylinder of a railway car, a casing having an air flow passage therein connecting the brake control valve and the brake cylinder, a valve member slidable in said flow passage and having means therein normally permitting air flow between said brake control valve and said brake cylinder through said flow passage, means for operating said valve member to shift said means to close said flow passage and exhaust said brake cylinder to atmosphere while retaining air pressure in said brake control valve, means for maintaining said valve member in operated position while air pressure in said brake control valve is at a predetermined value, means for restoring said valve member to normal position when the air pressure is exhausted in said brake control valve, and means controlled by said valve member for partially restoring said valve member when the air pressure in said brake control valve is reduced to an intermediate value whereby said valve member is restored.

15. In a brake cylinder release valve including a movable valve member in the valve casing comprising a hollow sleeve member having air ports in the sides thereof, a vent valve seating portion on the bottom end and a piston on the top end, a restricted air passage in said valve member below said air ports, a cup-shaped member supported on top of said piston, a reset spring inside said cup-shaped member extending from the bottom of said cup-shaped member to the casing top wall, a second reset spring on the outside of said cup-shaped member extending from the top of said piston to a loose ring on the top end of said cup-shaped member, said casing having a shoulder serving as a stop for the movement of said piston and valve member while said first reset spring is compressed, and a second shoulder on said casing serving as a stop for said cup-shaped ring to compress said second reset spring.

16. In a brake cylinder release valve including a movable valve member in a valve casing, comprising a hollow sleeve member having air ports in the sides thereof, a vent valve seating portion on the bottom end and a piston on the top end, a restricted air passage in said valve member, below said air ports, a reset spring extending from the piston to the casing top wall, a second reset spring extending from the top of the piston to a movable abutment member movable with the second reset spring, said casing having a first stop for the movement of said piston and valve member while the first reset spring is compressed, and a second stop serving as a stop for said movable abutment, to compress said second reset spring.

17. In a brake cylinder release valve having a casing connected between a brake control valve and a brake cylinder, a main valve stem having a double acting valve member at one end and a piston on the other end, a pair of spaced apart upper and lower valve seats adapted to be alternately closed and opened by said valve member, to control air pressures between said brake control valve and said brake cylinder, manually operated means adapted to engage one end of said valve stem to shift said valve member from said lower valve seat to said upper valve seat, spring means for restoring said valve member back to said lower valve seat, said piston being at times subject to different air pressures on the bottom side thereof, and resilient means engaged by said piston responsive to a certain predetermined presure value for shifting said valve member toward said lower valve seat, to cause said valve member to only partially open from said upper valve seat, said resilient means comprising a caged spring and a collar slidable in said casing against which said caged spring normally bears, said casing having opposed shoulders on opposite sides of said collar for limiting its movement.

18. In a brake cylinder release valve, a casing having a connection with a brake control valve and with a brake cylinder, a valve stem in said casing having a double acting valve member on one end and a piston slidable in said casing on the other end, a valve seat in said casing opened by said valve member to permit free passage of air pressure from said brake control valve to said brake cylinder, a main spring on said valve stem bearing against said piston and biasing said valve member in open position, manually operated means in said casing for operating said valve stem to move said valve member to close on said valve seat and exhaust the air pressure from said brake cylinder while retaining the air pressure from said brake control valve, said retained air pressure being effective on one side of said piston opposed to said main spring to hold said valve member closed upon its seat after said manually operating means is released, and means in said casing engaged by said piston for causing only a partial opening of said valve member from its seat when the retained air pressure reaches a certain predetermined reduced value, said last means comprising a collar slidable in said casing and a secondary spring bearing against said collar, said collar and spring adapted to cause movement of said piston at said reduced air pressure.

19. In a brake cylinder release valve of the character described, a casing having a cylinder and a valve stem extending therein, a piston on said valve stem slidable in said cylinder, a first restoring spring in said cylinder bearing against said piston, a slidable collar in said cylinder slidably retained in a spaced relationship from said piston, a second restoring spring in said cylinder bearing against said collar, said springs being of different values, a valve member on said stem and an upper and a lower valve seat in said casing opened and closed by said valve member, manual means for actuating said valve stem to close said valve member on said upper seat and open on its lower seat, said piston operative to first compress said first restoring spring and then cause movement of said slidable collar to compress said second restoring spring, air pressure means acting on said piston for holding said valve member closed upon its upper seat independent of said manual means and against the restoring action of said springs, said valve member being completely opened from its upper seat and closed on its lower seat when the air pressure acting on the piston is reduced to a certain value and only partially opened from its upper seat when the air pressure is reduced to an intermediate value.

20. In a brake cylinder release valve, a valve housing connected between a brake control valve and a brake cylinder, and defining an inlet chamber in communication with the brake control valve and an outlet chamber in communication with the brake cylinder, a three-position valve movable in said chambers, a piston associated therewith and responsive to pressure in the inlet chamber, said housing defining also a discharge opening from the outlet chamber to the atmosphere, means for normally holding the three-position valve in position to close said discharge opening to the atmosphere while permitting communication between the inlet chamber and the outlet chamber, manually operable means for tripping said three-position valve to a discharge position, and for thereby permitting air to flow through the discharge opening to the atmosphere, and means effective at predetermined pressure conditions in said inlet chamber to position the three-position valve in an intermediate position, said means including one or more springs opposed to the piston in opposition to the pressure in the inlet chamber.

References Cited

UNITED STATES PATENTS

| | | | |
|---|---|---|---|
| 3,145,064 | 8/1964 | Billeter et al. | 303—69 |
| 3,177,043 | 4/1965 | Billeter | 303—69 |
| 3,244,456 | 4/1966 | Henricks et al. | 303—69 |
| 3,385,638 | 5/1968 | Mong et al. | 303—69 |

MILTON BUCHLER, Primary Examiner

J. J. McLAUGHLIN, Assistant Examiner

U.S. Cl. X.R.

137—625.68